United States Patent
Saito et al.

(10) Patent No.: US 9,245,565 B2
(45) Date of Patent: Jan. 26, 2016

(54) MAGNETIC RECORDING MEDIUM LUBRICANT MIXTURE AND SYSTEMS THEREOF

(71) Applicant: HGST Netherlands B.V., Amsterdam (NL)

(72) Inventors: Yoko Saito, Ishioka (JP); Hiroyuki Matsumoto, Chigasaki (JP); Sukefumi Ito, Odawara (JP); Yoshihiko Ooeda, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 132 days.

(21) Appl. No.: 13/918,719

(22) Filed: Jun. 14, 2013

(65) Prior Publication Data

US 2014/0368947 A1 Dec. 18, 2014

(51) Int. Cl.
*G11B 5/66* (2006.01)
*G11B 5/725* (2006.01)
(Continued)

(52) U.S. Cl.
CPC ............. *G11B 5/725* (2013.01); *C10M 105/54* (2013.01); *C10M 111/04* (2013.01); *G11B 5/8408* (2013.01); *G11B 21/02* (2013.01); *C10M 2211/0425* (2013.01); *C10M 2213/043* (2013.01); *C10N 2230/06* (2013.01); *C10N 2240/204* (2013.01); *C10N 2250/10* (2013.01)

(58) Field of Classification Search
None
See application file for complete search history.

(56) References Cited

U.S. PATENT DOCUMENTS

| 5,453,539 A | 9/1995 | Kondo et al. |
| 6,348,266 B1 | 2/2002 | Liu et al. |

(Continued)

FOREIGN PATENT DOCUMENTS

| EP | 0 655 733 B1 | 3/1999 |
| JP | 2010-282707 | 12/2010 |

OTHER PUBLICATIONS

Bhushan et al., "Wear and degradation mechanisms of magnetic thin-film rigid disks with different lubricants using mass spectrometry," Journal of Applied Physics, vol. 81, Issue 8, 1997, 3 pages, abstract only.

(Continued)

*Primary Examiner* — Holly Rickman
(74) *Attorney, Agent, or Firm* — Zilka-Kotab, PC (57) ABSTRACT

In one embodiment, a magnetic recording medium includes a magnetic recording layer adapted to store magnetic information, a protective film positioned above the recording layer, the protective film being adapted to reduce wear to the magnetic recording layer, and a lubricant positioned above the protective film, the lubricant being adapted to provide a stable head-to-disk interface, wherein the lubricant includes a first lubricant, the first lubricant including a material having the following chemical formula:

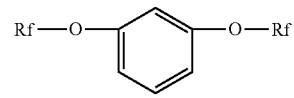

wherein Rf represents:

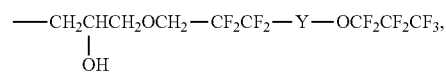

and wherein Y is a repeating chain including carbon and fluorine.

19 Claims, 8 Drawing Sheets

(51) Int. Cl.
*G11B 21/02* (2006.01)
*C10M 105/54* (2006.01)
*G11B 5/84* (2006.01)
*C10M 111/04* (2006.01)

(56) References Cited

U.S. PATENT DOCUMENTS

| | | | |
|---|---|---|---|
| 6,740,414 B2 | 5/2004 | Yatsue | |
| 7,998,912 B2 | 8/2011 | Chen et al. | |
| 8,039,132 B2 | 10/2011 | Shimizu et al. | |
| 8,668,995 B2* | 3/2014 | Shimizu et al. | 428/835.8 |
| 2005/0037932 A1 | 2/2005 | Liu et al. | |
| 2006/0052262 A1 | 3/2006 | Akada et al. | |
| 2010/0069275 A1* | 3/2010 | Marchionni et al. | 508/582 |
| 2012/0021253 A1 | 1/2012 | Nakata et al. | |
| 2012/0055779 A1 | 3/2012 | Vezzulli et al. | |
| 2012/0251843 A1* | 10/2012 | Yan et al. | 428/800 |

OTHER PUBLICATIONS

Smith et al., "Atomistically Tuning Lubricant Adhesion on Carbon Overcoat Surface," IEEE Transactions on Magnetics, vol. 48, No. 11, Nov. 2012, pp. 4273-4276, abstract only.

Kajdas et al., "Mechanism of Interaction and Degradation of Perfluoropolyethers with a DLC Coating in Thin-Film Magnetic Rigid Disks: A Critical Review," J. Info. Storage Proc. Syst., vol. 1, 1999, pp. 1-19.

* cited by examiner

MAGNETIC RECORDING MEDIUM LUBRICANT MIXTURE AND SYSTEMS THEREOF

FIELD OF THE INVENTION

The present invention relates to a magnetic recording medium lubricant, and more particularly, this invention relates to a lubricant which is a mixture of two or more lubricants that suppresses head abrasion while retaining adsorbability.

BACKGROUND

The heart of a computer is a magnetic hard disk drive (HDD) which typically includes a rotating magnetic disk storage medium, a magnetic head (or slider) that includes one or more reading elements and/or one or more writing elements, a suspension arm above the rotating disk, and an actuator arm that swings the suspension arm to place the magnetic head over selected circular tracks on the rotating disk. The magnetic head floats so close to the surface of the magnetic disk that head contact may occur, possibly with detrimental effect on the reading and/or writing elements within the head.

In order to protect the reading and writing elements of the magnetic head, a protective film is formed at the air bearing surface (ABS) of the magnetic head (or slider). However, when the frequency of contact with the disk increases as the clearance is narrowed, there is a possibility that significant abrasion of the protective film and reading and/or writing elements therebeneath will occur. The amount of abrasion may be reduced by increasing the film thickness of the lubricant on the disk.

However, the thicker the lubricant film becomes, the greater the clearance between the disk and the head. In order to reduce the clearance, a lubricant that is capable of suppressing the head abrasion in a thin film while retaining the adsorbability to a disk is desired. According to Japanese Patent No. JP2010-282707A, adsorbability to a disk may be retained by having polar groups at the terminals and an aromatic ring at a center of a lubricant molecule, but with this formulation, a lubricating property of the molecule is lost and therefore there is a possibility of increasing the head abrasion, instead of reducing it.

SUMMARY

In one embodiment, a magnetic recording medium includes a magnetic recording layer adapted to store magnetic information, a protective film positioned above the recording layer, the protective film being adapted to reduce wear to the magnetic recording layer, and a lubricant positioned above the protective film, the lubricant being adapted to provide a stable head-to-disk interface, wherein the lubricant includes a first lubricant, the first lubricant including a material having the following chemical formula:

wherein Rf represents:

and wherein Y is a repeating chain including carbon and fluorine.

In another embodiment, a lubricant for providing a stable head-to-disk interface includes a mixture of a first lubricant and a second lubricant, wherein the first lubricant includes a material having the following chemical formula:

wherein two or more hydrogen atoms of an aromatic ring are substituted with a perfluoropolyether chain (Rf) which does not have a polar group at a terminal thereof, and wherein the second lubricant includes a material having the chemical formula $X—CH_2CF_2CF_2O—Z—CF_2CF_2CH_2—X$, wherein X is a polar terminal group, and wherein Z is a repeating chain including carbon and fluorine.

In yet another embodiment, a method for forming a magnetic head includes forming a protective film above a magnetic recording layer that is adapted to store magnetic information, the protective film being adapted to reduce wear to the magnetic recording layer, forming a lubricant above the protective film, the lubricant being adapted to provide a stable head-to-disk interface, wherein the lubricant includes a first lubricant, the first lubricant including a material having the following chemical formula:

wherein Rf represents:

and wherein Y is a repeating chain including carbon and fluorine.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic recording medium includes a magnetic recording layer adapted to store magnetic information, a protective film positioned above the recording layer, the protective film being adapted to reduce wear to the magnetic recording layer, and a lubricant positioned above the protective film, the lubricant being adapted to provide a stable head-to-disk interface, wherein the lubricant includes a first lubricant, the first lubricant including a material having the following chemical formula:

wherein Rf represents:

and wherein Y is a repeating chain including carbon and fluorine.

In another general embodiment, a lubricant for providing a stable head-to-disk interface includes a mixture of a first lubricant and a second lubricant, wherein the first lubricant includes a material having the following chemical formula:

wherein two or more hydrogen atoms of an aromatic ring are substituted with a perfluoropolyether chain (Rf) which does not have a polar group at a terminal thereof, and wherein the second lubricant includes a material having the chemical formula X—$CH_2CF_2CF_2O$—Z—$CF_2CF_2CH_2$—X, wherein X is a polar terminal group, and wherein Z is a repeating chain including carbon and fluorine.

In yet another general embodiment, a method for forming a magnetic head includes forming a protective film above a magnetic recording layer that is adapted to store magnetic information, the protective film being adapted to reduce wear to the magnetic recording layer, forming a lubricant above the protective film, the lubricant being adapted to provide a stable head-to-disk interface, wherein the lubricant includes a first lubricant, the first lubricant including a material having the following chemical formula:

wherein Rf represents:

and wherein Y is a repeating chain including carbon and fluorine.

Figure 1:
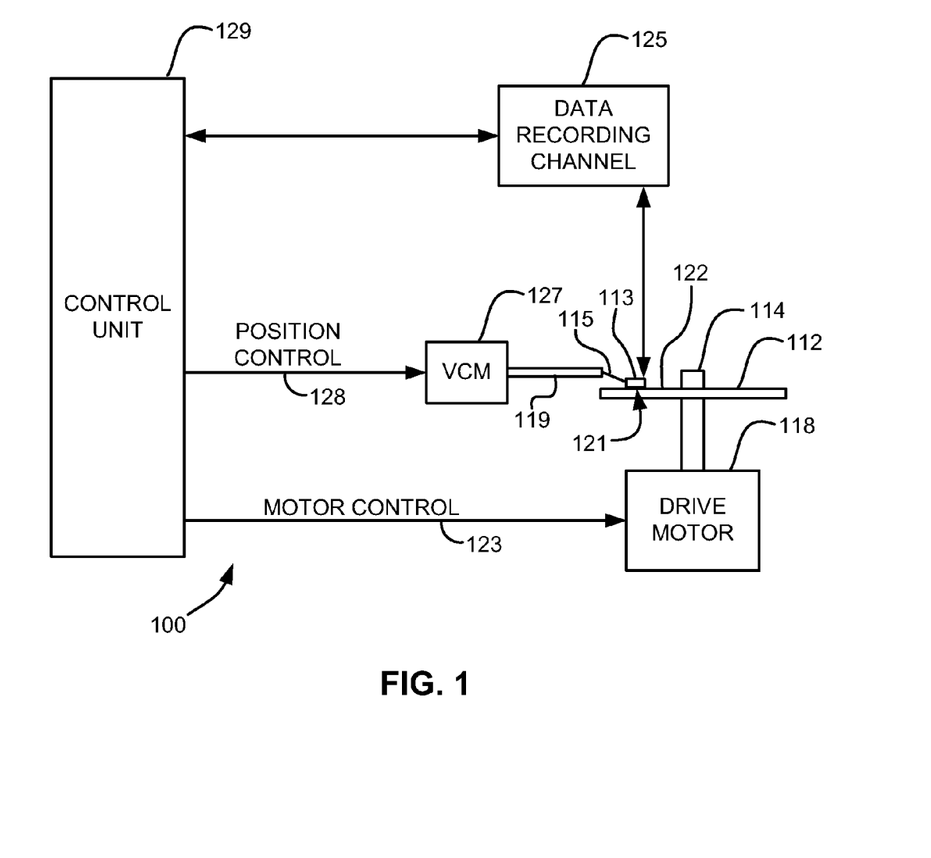
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write portions 121. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
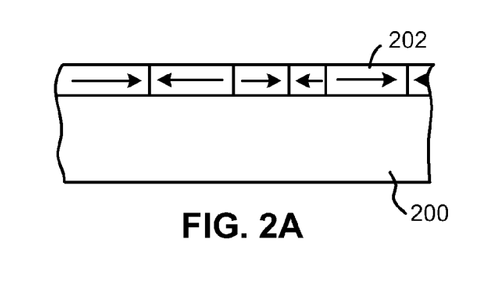
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
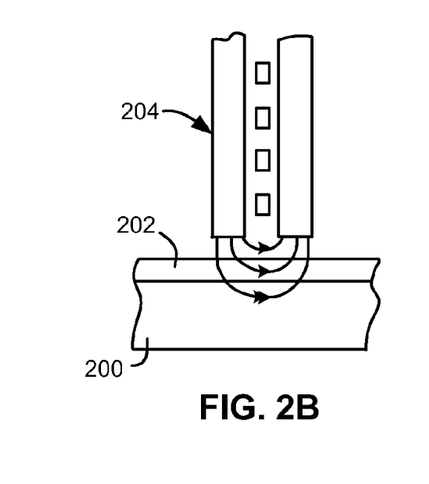
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
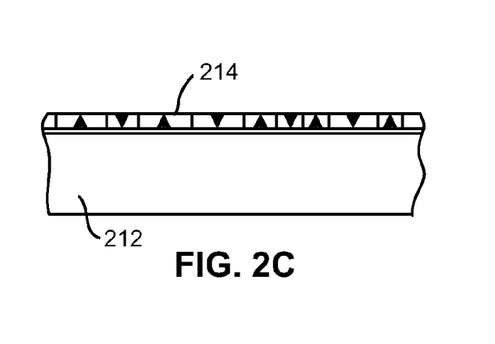
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
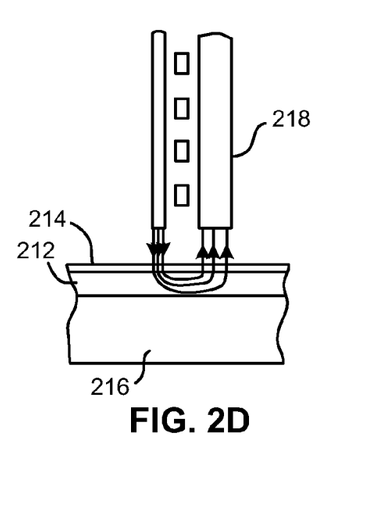
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
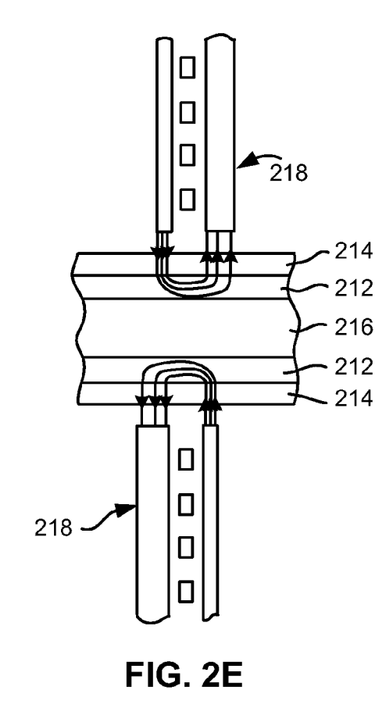
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
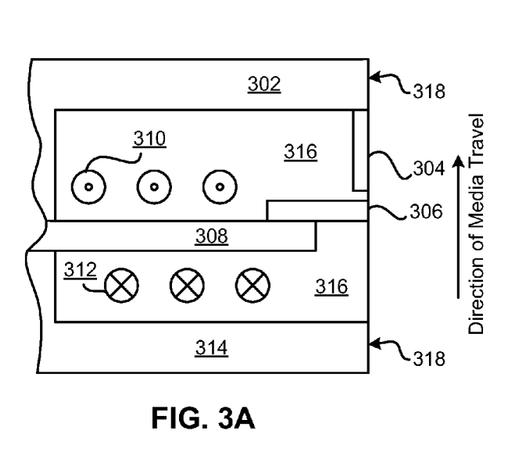
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
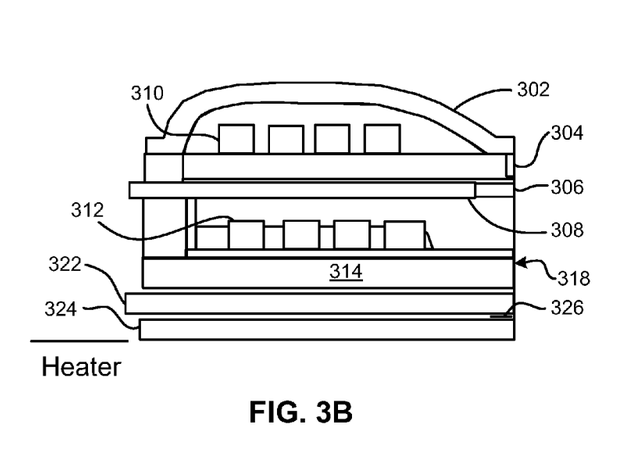
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
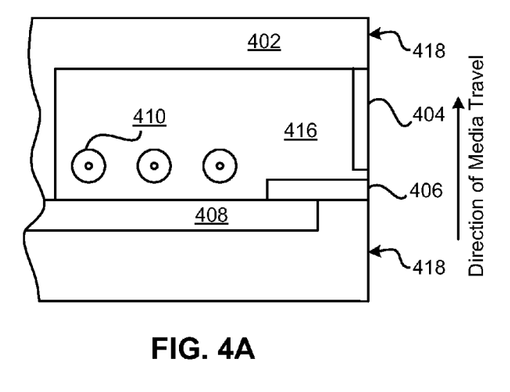
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
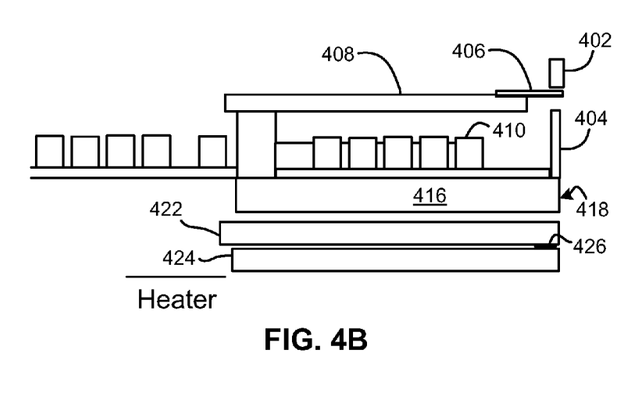
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater element may vary based on design parameters such as where the protrusion is desired, coefficients of thermal expansion of the surrounding layers, etc.

A problem encountered with magnetic heads which float close to an upper surface of a magnetic disk medium is the clearance between the two surfaces. In order to achieve high areal density in the magnetic disk medium, the clearance should be as small as possible. A thinner lubricant film on top of the magnetic disk medium typically results in lower lubricant pickup by the magnetic head (which is good) but also showed heavier protective film wear. A thicker lubricant film shows less protective film wear, but vastly larger amounts of lubricant pickup (which is bad). Accordingly, conventional lubricant systems are not adequate to enhance areal recording density on magnetic disk media.

Figure 5:
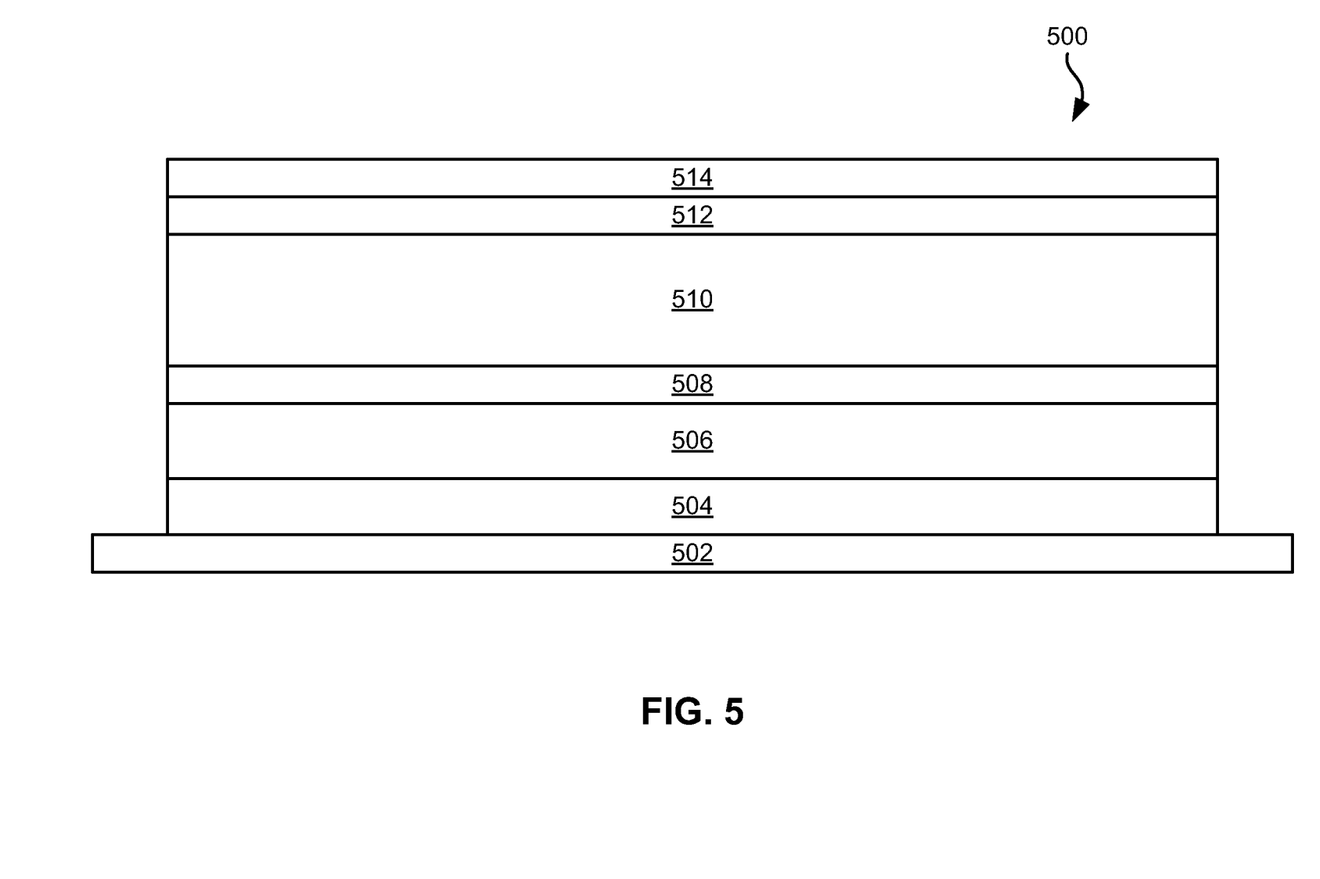
FIG. 5 shows a magnetic recording medium according to one embodiment.

Now referring to FIG. 5, a magnetic recording medium 500 is shown according to one embodiment. The magnetic recording medium 500 comprises at least a non-magnetic substrate 502, a magnetic recording layer 510 positioned above the non-magnetic substrate 502, the magnetic recording layer 510 being adapted to store magnetic information (such as data, files, directories, data sets, etc., in bits of the recording layer), and a protective film 512 positioned above the magnetic recording layer 510. The protective film 512 may be referred to herein as an air bearing surface overcoat (ABSOC), and is adapted to reduce or prevent wear to the magnetic recording layer 510. Furthermore, a lubricant 514 is applied to an upper surface of the protective film 512 (a magnetic head-facing surface) of the magnetic recording medium 500. The lubricant 514 is adapted to provide a stable head-to-disk interface between the magnetic recording medium 500 and a magnetic head floating thereabove.

The magnetic recording medium 500 may also include, in some approaches, any or all of an adhesion layer 504 formed above the substrate 502, a soft magnetic underlayer 506 formed above the substrate 502, and/or an underlayer 508 formed above the substrate 502. All of these layers may be formed below the magnetic recording layer 510 in one embodiment. In addition, these layers may include any suitable material as would be understood by one of skill in the art.

In one embodiment, the lubricant 514 may be a mixture of a first lubricant (Lubricant 1) and a second lubricant (Lubricant 2), the second lubricant varying anywhere from 1% to 99% in the mixture, by weight, volume, molecular ratio, etc. In another embodiment, the lubricant 514 may consist of 100%, or as close to 100% as possible, first lubricant.

The first lubricant is represented by Chemical Formula (I), below, in which two or more hydrogen atoms of an aromatic ring are substituted with a perfluoropolyether (PFPE) chain which does not have a polar group positioned at one terminal thereof. Rf in Chemical Formula (I) represents:

Chemical Formula (I)

In other embodiments, the —O—Rf groups of Chemical Formula (I) may be positioned at any of the other carbon atoms of the aromatic ring, such as in chemical formulae (Ia) and (Ib) shown below:

Chemical Formula (Ia)

Chemical Formula (Ib)

The second lubricant is PFPE-based and is represented by Chemical Formula (II), below, which has one or more polar groups positioned at both terminals thereof.

X—CH$_2$CF$_2$CF$_2$O—Z—CF$_2$CF$_2$CH$_2$—X    Chemical Formula (II)

In one embodiment, the terminal group, X as shown in Chemical Formula (II), is a polar terminal group, such as —OH, such that X represents one hydroxyl group. In another embodiment, X may represent In various embodiments, Y and/or Z may be a repeating chain structure in Chemical Formulas (I) and (II), and may comprise carbon (C) and fluorine (F).

In accordance with one embodiment, Y and/or Z, is a repeating chain structure in Chemical Formulas (I) and (II), and may represent —(CF$_2$CF$_2$CF$_2$O)$_m$—. In each of Chemical Formulas (I) and (II), in the repeating chain structure of Y and/or Z, m is an integer that denotes a length of each chain and may have a value of 10 or less, such as 2, 3, 4, 6, etc.

In another embodiment, m may vary from molecule to molecule, but may maintain an average value of about 4 to about 10. This limitation on the length of the chain helps to restrict the molecular height of the lubricant molecules.

In an alternate embodiment, Y and/or Z may represent $-(CF_2O)_n(C_2F_4O)_p-$, where p and n are integers. Again, p may be 10 or less on average, while n may be 10 or less, thereby restricting the molecular height of molecules of the first and second lubricants.

In some approaches, the first lubricant may have a molecular weight in a range from about 1500 g/mol to about 4000 g/mol, such as about 3200 g/mol (with Y and/or Z being $-(CF_2CF_2CF_2O)_m-$ and m=7).

By utilizing any of the lubricant mixtures described above according to various embodiments, the adsorbability of the lubricant mixture to a magnetic disk surface may be improved due to the hydroxyl group and the aromatic ring's position in the center of Chemical Formula (I), which resists the transfer of lubricant to the magnetic head during use of a disk drive. Specifically, the lubricant mixture may strongly adsorb onto the disk medium protective film 512 to prevent condensation and provide anti-lube-pickup. Furthermore, relaxation in the lubricant mixture molecules' repeating chain (Y) may reduce wear to the protective film 512.

In addition, since the aromatic ring maintains a parallel adhesion state on the magnetic disk, the height of each singular molecule may be reduced, which may possibly contribute to narrowing the clearance between the head and magnetic recording layer 510 of the magnetic disk medium 500 as a result. At the same time, the chain represented by Rf in Chemical Formula (I) retains lubricating properties due to the absence of polarity at the terminals thereof, and thus is effective in reducing abrasion of the protective film 512 thereunder and reading and/or writing elements of the head.

However, Rf in Chemical Formula (I) exhibits weak adsorbability to the surface of a magnetic disk medium 500, and therefore the second lubricant represented by Chemical Formula (II) may be mixed therewith, in which case the second lubricant adsorbs to locations of the magnetic disk 500 surface with low coverage, and adhesion of contaminants may be prevented.

The lubricant 514 may be coated above or directly on the protective film 512, which may comprise carbon, such as diamond-like carbon (DLC), or some other suitably hard material.

Figure 6:
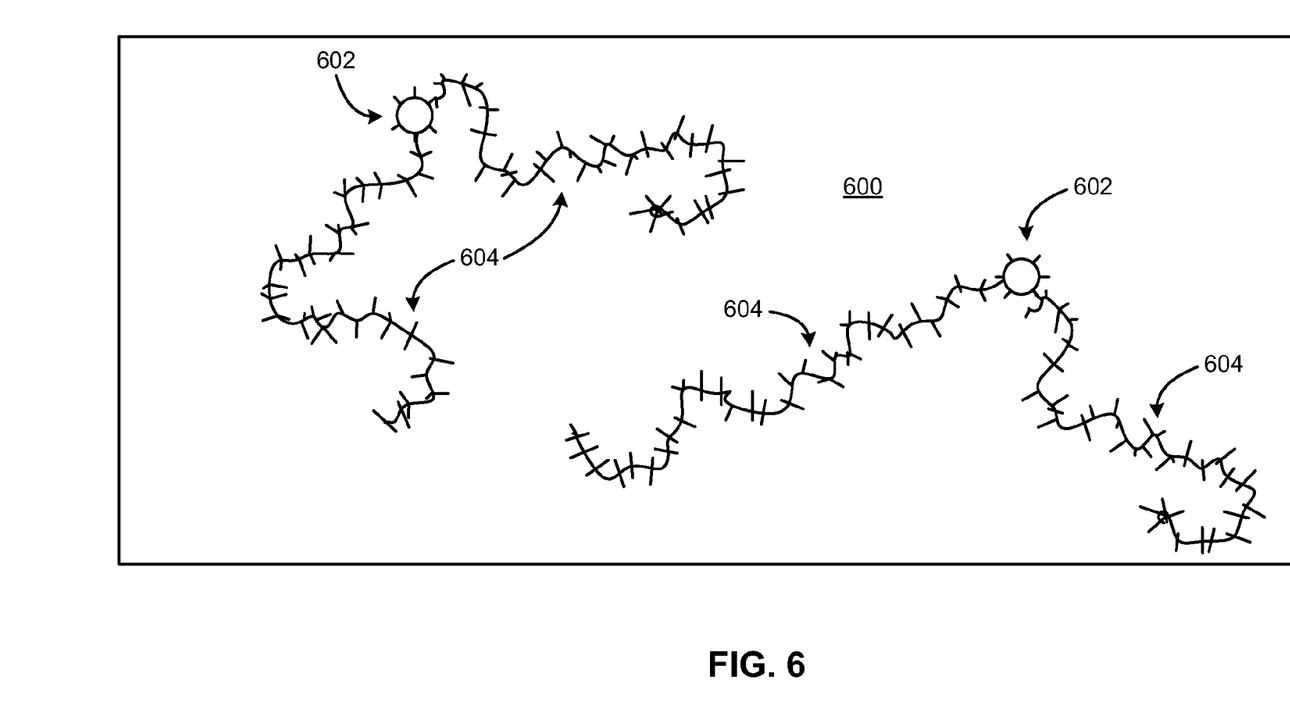
FIG. 6 shows a simplified schematic diagram of a protective film with two molecules of the first lubricant adhered thereto, in an exemplary embodiment.

The lubricant and structure were analyzed using molecular dynamics (MD) simulation on the first lubricant having a molecular weight of about 3178 g/mol (with Y and/or Z being $-(CF_2CF_2CF_2O)_m-$ and m=7). A simplified schematic diagram of a protective film 600, in accordance with an exemplary embodiment, with two molecules of the first lubricant adhered thereto is shown in FIG. 6. A stable conformation when two molecules of the first lubricant were placed on the carbon protective film 600 was produced. The experiment clearly demonstrated that the aromatic ring 602 at the center of the lubricant molecules has an arrangement such that the aromatic ring 602 is parallel with the protective film 600 of the medium and the chains 604 which extend on each side of the aromatic ring 602 do not form a random coil, but instead are stretched out. Furthermore, from these experiments, it was also determined that the lubricant showed a very low profile on the protective film 600 when a plurality of molecules were present.

Figure 7:
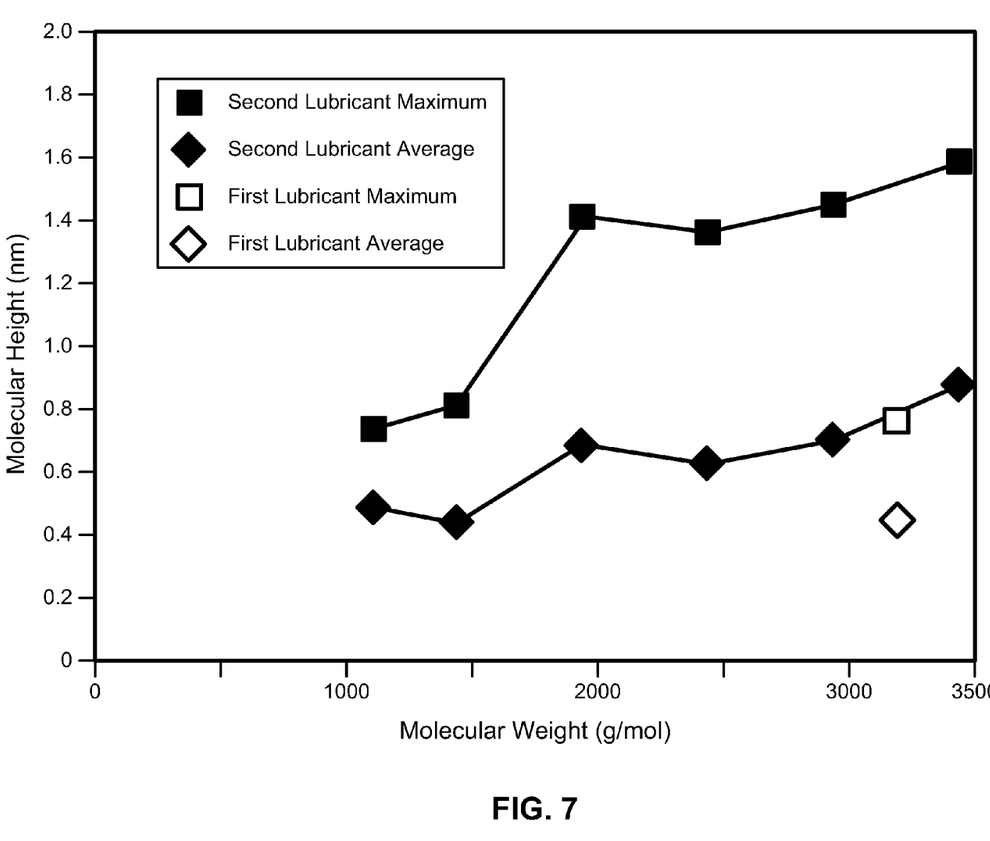
FIG. 7 shows molecular height in relation to molecular weight of a first and a second lubricant, according to an exemplary embodiment.

FIG. 7 shows the molecular height in relation to the molecular weight of the first and second lubricants, according to an exemplary embodiment. The maximum height of the second lubricant was observed when the molecular weight is about 3000 g/mol, with the height being about 1.4 nm; however, the maximum height of the first lubricant was much less, about 0.8 nm or less, even at a molecular weight of about 3200 g/mol.

An experiment was performed where stable film conformation was obtained by simulation for the following cases: (a) with 100% of the first lubricant; (b) with a mixed lubricant of 75% of the first lubricant and 25% of the second lubricant; and (c) with 100% of the second lubricant. The average film thickness for all cases is 1 nm. In the case of (c) with 100% of the second lubricant, it was clear that at the same average film thickness, the coverage is poorer than that in cases (a) and (b), in part because a portion of the protective film was exposed in this test case. In addition, the maximum height was 1.9 nm, which may lead to increased lubricant pickup.

In the case of (a) with 100% of the first lubricant, the coverage was significantly improved over case (c), with the maximum height being only 1.5 nm. However, there were patches of smaller density lubricant that formed near the functional groups of the molecules.

In the case of the mixed system (b), a lubricating film having no gaps was formed. The reason is thought to be that the polar groups at the terminals in the second lubricant were adsorbed in such a way as to fill the gaps in the first lubricant and thus a dense and even film was formed. The maximum height of the lubricating film was also suppressed to a lower level in the mixed system (b), where the maximum height was only 1.5 nm.

Since the probability of contact between the disk and the head decreases when a small maximum height of the lubricant film, a reduction in lubricant transfer to the head should be expected.

In one embodiment, the mixture of the first lubricant and the second lubricant may comprise at least 50% of the first lubricant, such as 60%, 70%, 75%, 80%, 90%, etc.

Figure 8:
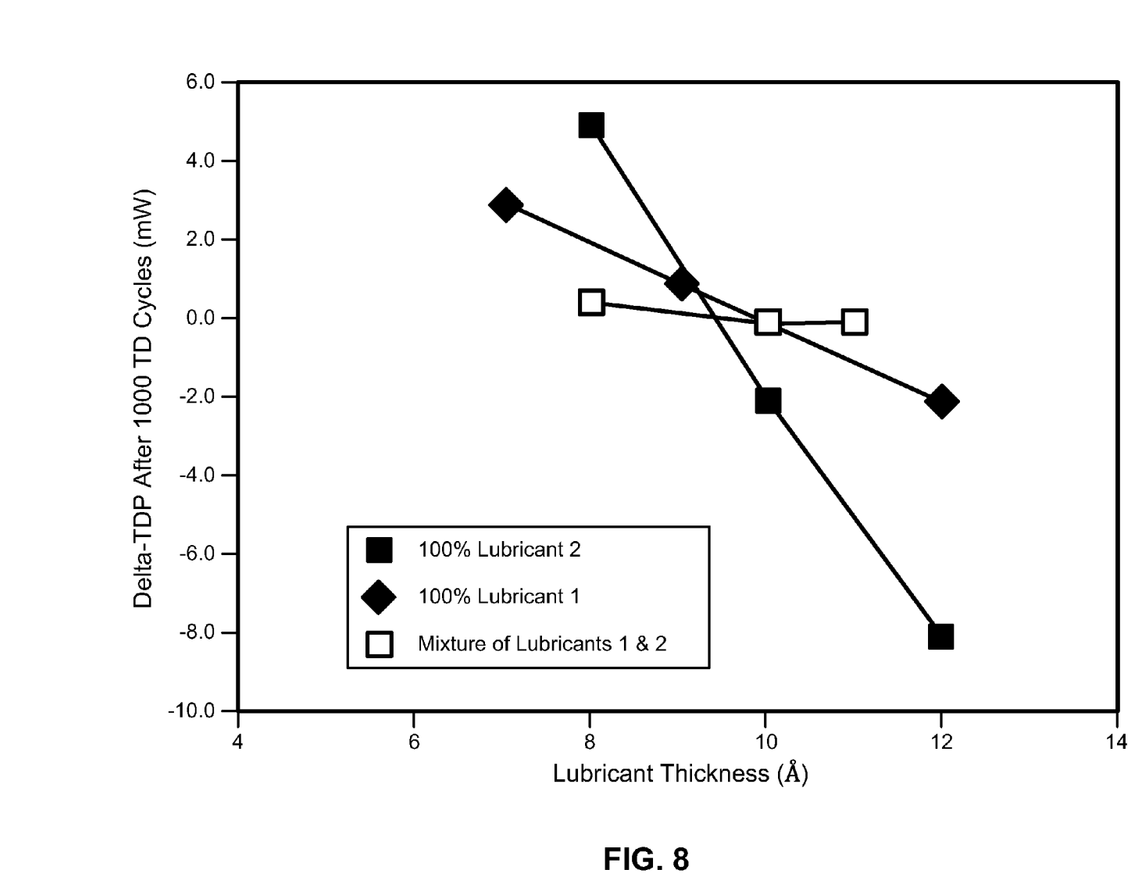
FIG. 8 shows change (Delta-TDP) in touch-down power (TDP) with respect to a lubricating film thickness, which is determined by experiment, according to an exemplary embodiment.

FIG. 8 shows the change (Delta-TDP) in the touch-down power (TDP) with respect to the lubricating film thickness, as determined by experiment. TDP is the power required to enable contact with the medium by applying power to a heater positioned in the magnetic head in order to cause thermal expansion in one or more portions of the head. The contact with the medium is detected when there is a rise in the output from an acoustic emission (AE) sensor attached near the magnetic slider suspension. The phenomena of head abrasion and lubricant transfer, or the like, may be ascertained by monitoring the amount of power change. In order to accelerate the abrasion or transfer phenomenon for evaluation, the head element is brought into contact with the medium 1000 times (cycles), and the change in the amount of power needed to cause touch-down from the initial TDP is represented as Delta-TDP.

A Delta-TDP value that is greater than 0 indicates that the head abrasion is greater than the amount of head abrasion indicated by a Delta-TDP value that is about 0, while a Delta-TDP value that is less than 0 indicates that the amount of lubricant transferring to the head is greater than a Delta-TDP value that is about 0. In other words, it is ideal for the Delta-TDP value to remain unchanged at around 0 even when the film thickness of the lubricant is increased or decreased.

When the lubricant on the medium is 100% second lubricant, the Delta-TDP plot shows a substantial change, and there is a great amount of head abrasion when the film thickness is reduced to about 9 Å or less. Meanwhile, when the lubricant on the medium is 100% first lubricant, there is less change in Delta-TDP in relation to a change in the film thickness. When the lubricant on the medium is a mixed lubricant of both the first and second lubricants, there is very little change in the Delta-TDP value, which is desirable. This result indicates that by using a mixed system of the first and second lubricants, the head abrasion may be suppressed to a smaller amount than even when the first lubricant is used in substantially pure form, even when the film thickness is reduced to about 8 Å or less.

As is clear from the results above, the first lubricant, according to one embodiment, is capable of suppressing the molecular height to a desirably low level while retaining adsorbability to a disk due to the aromatic ring near the center portion thereof, retaining lubricating properties by not having polarity at the terminals of the chain, and contributing to a reduction in head abrasion. This effect is more effective when a mixed system of the first and second lubricants is used, in additional embodiments.

In one embodiment, the lubricant may have a thickness of greater than about 2 Å and less than about 12 Å in order to achieve the described benefits.

In one approach, a magnetic data storage system as shown in FIG. 1, may comprise at least one magnetic head, a magnetic medium according to any embodiment described herein, a drive mechanism for passing the magnetic medium over the at least one magnetic head, and a controller electrically coupled to the at least one magnetic head for controlling operation of the at least one magnetic head.

Figure 9:
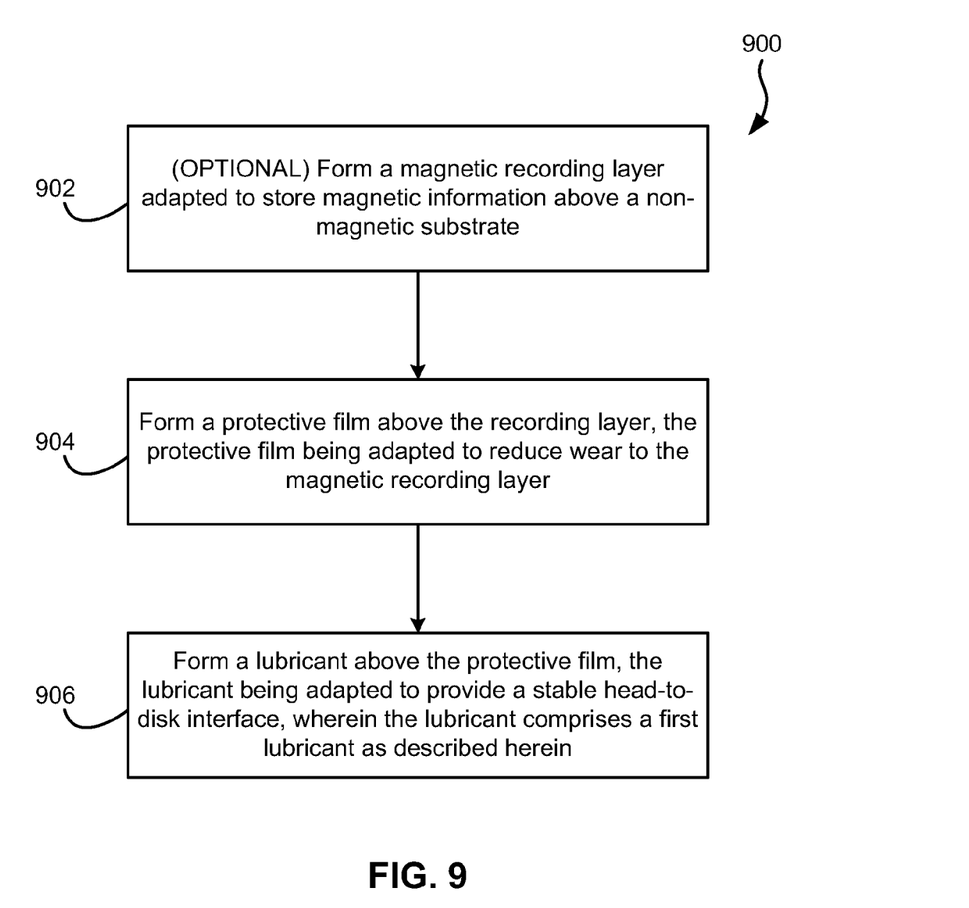
FIG. 9 shows a flowchart of a method, according to one embodiment.

FIG. 9 shows a method 900 for forming a magnetic head capable of suppressing write protrusion in accordance with one embodiment. As an option, the present method 900 may be implemented to construct structures such as those shown in FIGS. 1-8.

Of course, this method 900 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In the following operations, any known formation technique(s) may be used, such as sputtering, plating, ion-deposition, etc. Furthermore, unless otherwise noted, any of the various layers may be formed to a thickness suitable for the desired operation of the layer within a magnetic head.

In optional operation 902, a magnetic recording layer adapted to store magnetic information is formed above a non-magnetic substrate. In other approaches, the disk medium may be acquired and/or manufactured in a separate process than process 900.

In operation 904, a protective film is formed above the recording layer, the protective film being adapted to reduce wear to the magnetic recording layer In operation 906, a lubricant is formed above the protective film, the lubricant being adapted to provide a stable head-to-disk interface. The lubricant may be formed at a manufacturing site of the magnetic head, or later at a site where the magnetic head is to be used, or anywhere therebetween.

The lubricant comprises a first lubricant, which includes a material having the following chemical formula:

with Rf representing:

with Y being a repeating chain comprising carbon and fluorine.

In one embodiment, the lubricant may be a mixture of the first lubricant and a second lubricant, the second lubricant comprising a material having the chemical formula, X—CH$_2$CF$_2$CF$_2$O—Z—CF$_2$CF$_2$CH$_2$—X, with X being a polar terminal group, and with Z being a repeating chain comprising carbon and fluorine.

In further embodiments, Y and/or Z in at least one of the first lubricant and the second lubricant may be one of: —(CF$_2$CF$_2$CF$_2$O)$_m$—, wherein m is an integer that denotes a length of each Y and/or Z chain and has a value of no more than 10, and —(CF$_2$O)$_n$(C$_2$F$_4$O)$_p$—, wherein p and n are integers that denote a length of each chain and have values of no more than 10.

It should be noted that methodology presented herein for at least some of the various embodiments may be implemented, in whole or in part, in computer hardware, software, by hand, using specialty equipment, etc., and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
a magnetic recording layer configured to store magnetic information;
a protective film positioned above the recording layer, the protective film being configured to reduce wear to the magnetic recording layer; and
a lubricant positioned above the protective film, the lubricant being configured to provide a stable head-to-disk interface,
wherein the lubricant comprises a first lubricant, the first lubricant comprising a material having the following chemical formula:

wherein Rf represents:

wherein Y is $(CF_2CF_2CF_2O)_m-$ or $-(CF_2O)_n(C_2F_4O)_p-$, and wherein m, p and n are each independently an integer greater than 0 and less than or equal to 10.

2. The magnetic recording medium as recited in claim 1, wherein the lubricant is a mixture of the first lubricant and a second lubricant, the second lubricant comprising a material having the chemical formula, $X-CH_2CF_2CF_2O-Z-CF_2CF_2CH_2-X$, wherein X is a polar terminal group, and wherein Z comprises at $(CF_2CF_2CF_2O)_m-$ or $-(CF_2O)_n(C_2F_4O)_p-$, and wherein m, p and n are each independently an integer greater than 0 and less than or equal to 10.

3. The magnetic recording medium as recited in claim 2, wherein X is —OH.

4. The magnetic recording medium as recited in claim 2, wherein X is

5. The magnetic recording medium as recited in claim 2, wherein Z is $-(CF_2CF_2CF_2O)_m-$, wherein m is an integer having an average value of about 4 to about 10.

6. The magnetic recording medium as recited in claim 2, wherein the mixture of the first lubricant and the second lubricant comprises at least 50% of the first lubricant and from 1% to 50% of the second lubricant.

7. The magnetic recording medium as recited in claim 2, wherein Z is $-(CF_2O)_n(C_2F_4O)_p-$, and wherein p and n are integers having values of no more than 10.

8. The magnetic recording medium as recited in claim 2, wherein Y and Z are each $-(CF_2CF_2CF_2O)_m-$, and wherein m is an integer greater than 0 and less than 10.

9. The magnetic recording medium as recited in claim 8, wherein m has an average value of about 4 to about 10, and wherein the first lubricant has a molecular weight in a range from about 1500 g/mol to about 4000 g/mol.

10. The magnetic recording medium as recited in claim 1, wherein the lubricant consists of 100% of the first lubricant.

11. The magnetic recording medium as recited in claim 2, wherein the lubricant is a mixture comprising at least 50% of the first lubricant and from 1% to 50% of the second lubricant.

12. The magnetic recording medium as recited in claim 1, wherein the lubricant has a thickness of greater than about 2A and less than about 12A.

13. A magnetic data storage system, comprising:
at least one magnetic head;
a magnetic medium as recited in claim 1;
a drive mechanism for passing the magnetic medium over the at least one magnetic head; and
a controller electrically coupled to the at least one magnetic head for controlling operation of the at least one magnetic head.

14. A lubricant for providing a stable head-to-disk interface, the lubricant comprising:
a mixture of a first lubricant and a second lubricant,
wherein the first lubricant comprises a material having the following chemical formula:

wherein two or more hydrogen atoms of an aromatic ring are substituted with a perfluoropolyether chain (Rf) which does not have a polar group at a terminal thereof, wherein Rf represents and Y is $(CF_2CF_2CF_2O)_m-$ or $-(CF_2O)_n(C_2F_4O)_p-$, and wherein m, p and n are each independently an integer greater than 0 and less than or equal to 10
wherein the second lubricant comprises a material having the chemical formula $X-CH_2CF_2CF_2O-Z-CF_2CF_2CH_2-X$, wherein X is a polar terminal group, and wherein Z is $(CF_2CF_2CF_2O)_m-$ or $-(CF_2O)_n(C_2F_4O)_p-$, and wherein m, p and n are each independently an integer greater than 0 and less than or equal to 10.

15. A magnetic data storage system, comprising:
at least one magnetic head;
a magnetic medium having the lubricant as recited in claim 14 applied thereto;
a drive mechanism for passing the magnetic medium over the at least one magnetic head; and
a controller electrically coupled to the at least one magnetic head for controlling operation of the at least one magnetic head.

16. A method for forming a magnetic head, the method comprising:
forming a protective film above a magnetic recording layer that is configured to store magnetic information, the protective film being configured to reduce wear to the magnetic recording layer;
forming a lubricant above the protective film, the lubricant being configured to provide a stable head-to-disk interface,
wherein the lubricant comprises a first lubricant, the first lubricant comprising a material having the following chemical formula:

wherein Rf represents:

and wherein Y is $(CF_2CF_2CF_2O)_m-$ or $-(CF_2O)_n(C_2F_4O)_p-$, and wherein m, p and n are each independently an integer greater than 0 and less than or equal to 10.

17. The method as recited in claim 16, wherein the lubricant is a mixture of the first lubricant and a second lubricant, the second lubricant comprising a material having the chemical formula, $X-CH_2CF_2CF_2O-Z-CF_2CF_2CH_2-X$, wherein X is a polar terminal group, and wherein Z is a repeating chain comprising $(CF_2CF_2CF_2O)_m-$ or $-(CF_2O)_n(C_2F_4O)_p-$, wherein m, p and n are each independently an integer greater than 0 and less than or equal to 10.

18. The method as recited in claim 17, wherein Z is one of: $-(CF_2CF_2CF_2O)_m-$, wherein m is an integer and has a value of no more than 10, and $-(CF_2O)_n(C_2F_4O)_p-$, wherein p and n are integers having values of no more than 10.

19. The magnetic recording medium as recited in claim 2, wherein the mixture of the first lubricant and the second lubricant comprises about 75% of the first lubricant and about 25% of the second lubricant.

\* \* \* \* \*